(12) United States Patent
Xia

(10) Patent No.: US 9,785,256 B2
(45) Date of Patent: Oct. 10, 2017

(54) ERGONOMIC COMPUTER MOUSE WITH HANDHELD AND AMBIDEXTROUS BODY DESIGN

(71) Applicant: Ming Xia, Calgary (CA)

(72) Inventor: Ming Xia, Calgary (CA)

( * ) Notice: Subject to any disclaimer, the term of this patent is extended or adjusted under 35 U.S.C. 154(b) by 107 days.

(21) Appl. No.: 14/622,941

(22) Filed: Feb. 16, 2015

(65) Prior Publication Data

US 2016/0239109 A1    Aug. 18, 2016

(51) Int. Cl.
*G06F 3/0354* (2013.01)
*G06F 3/0362* (2013.01)

(52) U.S. Cl.
CPC ........ *G06F 3/03541* (2013.01); *G06F 3/0362* (2013.01); *G06F 3/03543* (2013.01); *G06F 3/03549* (2013.01)

(58) Field of Classification Search
CPC ............. G06F 3/03543; G06F 3/03549; G06F 3/0219; G06F 3/0346
See application file for complete search history.

(56) References Cited

U.S. PATENT DOCUMENTS

| | | | | |
|---|---|---|---|---|
| 5,506,605 | A | * | 4/1996 | Paley ...................... G06F 3/011 340/407.2 |
| D380,208 | S | * | 6/1997 | Taylor .......................... D14/388 |
| D385,539 | S | * | 10/1997 | Taylor .......................... D14/388 |
| 5,894,303 | A | * | 4/1999 | Barr .................... G06F 3/03543 345/163 |

(Continued)

*Primary Examiner* — Amare Mengistu
*Assistant Examiner* — Jennifer Zubajlo

(57) ABSTRACT

This invention is an ergonomic computer mouse. The computer mouse body has a unique design in shape that may change the way for people to use a computer mouse. It is designed to be handheld by ring finger, little finger, and the hand part between thumb and index finger with a grip handle. A rear extrusion is smoothly curved and is designed to create a curved support area for the hand part between thumb and index finger. A trackball is confined in the body with a spherical housing and partially exposed on right side and left side of the body. The trackball is arranged near the middle of the body and above the grip handle so that thumb can reach it and operate it in its natural posture. A trackball cover is designed to separate the trackball and hand palm. Two click buttons and scroll wheel are arranged vertically on the fore edge of the body so that index finger and middle finger can naturally reach and operate them. A finger guard ring is designed to help adjusting the body's location in a hand palm with ring finger and little finger. A curved top edge and a front extrusion are designed to make the body shape look aesthetic. Two spherical extrusions on each side of the body are designed to provide 3-points support together with trackball on a flat surface. People can hold and use the mouse at any desired orientation without a flat surface and can use either right hand or left hand to operate it. It can also be used on a flat desk surface (even on a transparent flat surface) as people use a regular computer mouse. It allows people to take a comfortable desired posture to operate the computer mouse and allows people to change hand to operate it. As a result it can reduce discomfort, pain, and fatigue injury on a user's hand, arm, and shoulder when the user works on a computer with this invention.

5 Claims, 10 Drawing Sheets

(56) References Cited

U.S. PATENT DOCUMENTS

| | | | | |
|---|---|---|---|---|
| 5,982,356 A * | 11/1999 | Akiyama | | G06F 3/0338 |
| | | | | 345/156 |
| D430,161 S * | 8/2000 | Hovsepian | | D14/402 |
| 6,300,941 B1 * | 10/2001 | Segalle | | G06F 3/03543 |
| | | | | 345/163 |
| 6,664,947 B1 * | 12/2003 | Vinogradov | | G06F 3/03543 |
| | | | | 345/157 |
| 6,816,151 B2 * | 11/2004 | Dellinger | | G06F 3/014 |
| | | | | 345/161 |
| RE40,324 E * | 5/2008 | Crawford | | G06F 3/03549 |
| | | | | 345/156 |
| 9,285,898 B2 * | 3/2016 | Bowden | | G06F 3/03543 |
| 2002/0075233 A1 * | 6/2002 | White | | G05G 1/06 |
| | | | | 345/161 |
| 2002/0171625 A1 * | 11/2002 | Rothchild | | G06F 3/03549 |
| | | | | 345/156 |
| 2003/0206152 A1 * | 11/2003 | Shih | | G06F 3/0219 |
| | | | | 345/163 |
| 2004/0008184 A1 * | 1/2004 | Leahy | | G06F 3/03543 |
| | | | | 345/157 |
| 2004/0046732 A1 * | 3/2004 | Chesters | | G06F 3/0312 |
| | | | | 345/156 |
| 2004/0155865 A1 * | 8/2004 | Swiader | | G06F 3/0362 |
| | | | | 345/161 |
| 2004/0222966 A1 * | 11/2004 | McAuliffe | | G06F 3/0346 |
| | | | | 345/156 |
| 2005/0099389 A1 * | 5/2005 | Ma | | A63F 13/06 |
| | | | | 345/158 |
| 2005/0099390 A1 * | 5/2005 | Ma | | A63F 13/06 |
| | | | | 345/158 |
| 2005/0156889 A1 * | 7/2005 | Ma | | A63F 13/06 |
| | | | | 345/163 |
| 2005/0219214 A1 * | 10/2005 | Marsac | | A63F 13/245 |
| | | | | 345/163 |
| 2013/0063346 A1 * | 3/2013 | Fletcher-Price | | G06F 3/03543 |
| | | | | 345/157 |
| 2014/0015750 A1 * | 1/2014 | Chen | | G06F 3/0383 |
| | | | | 345/163 |

* cited by examiner

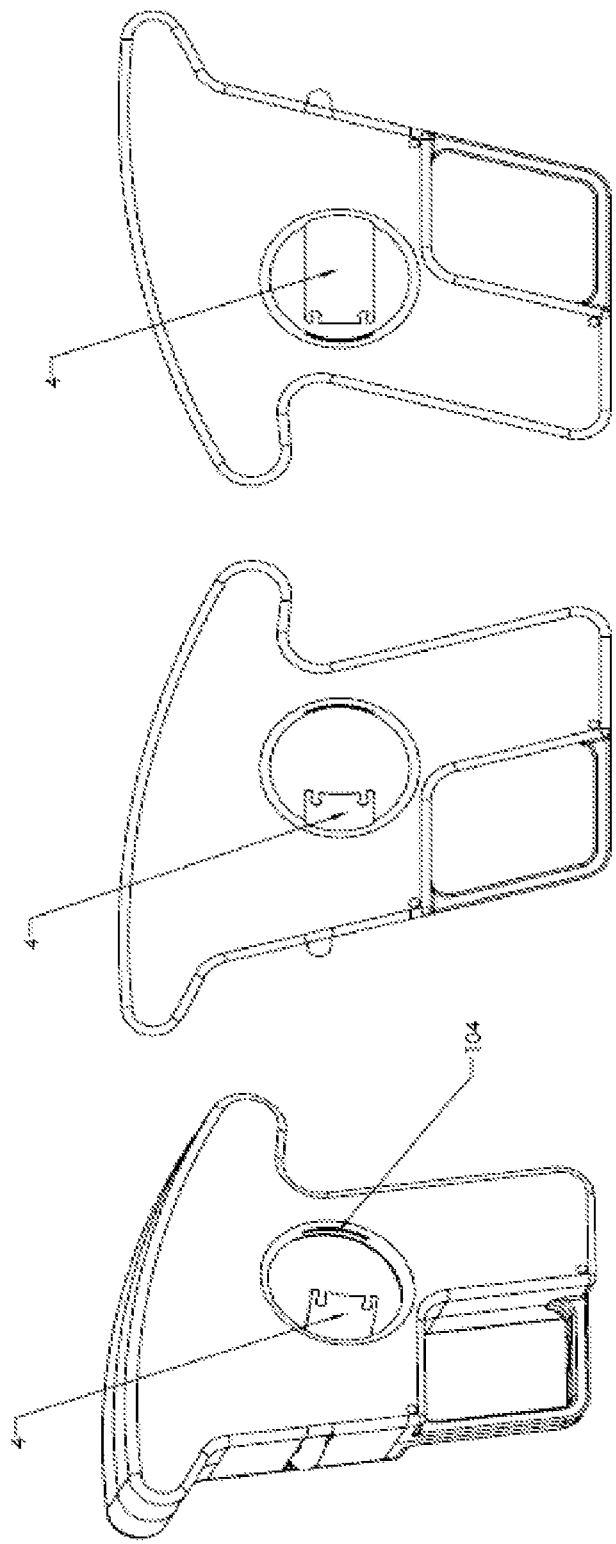

ERGONOMIC COMPUTER MOUSE WITH HANDHELD AND AMBIDEXTROUS BODY DESIGN

I. CROSS-REFERENCE TO RELATED APPLICATION

Not Applicable

II. TECHNICAL FIELD

The present invention relates to the technical field of computer mouse, particularly to an ergonomic computer mouse, which can be held at any desired orientation and is suitable to either right hand or left hand.

III. BACKGROUND ART

A computer mouse is an accessory device using with a computer to control a cursor on the screen to deal with documents and view internet. A mouse's movement on a desk is typically translated into the motion of a pointer on a display, which allows for fine control of a graphical user interface. Pointing, clicking, dragging, and scrolling are basic computer mouse operations. The mechanical and electronic components, as well as a printed circuit board inside a mouse body can realize these functions. on the other hand, a mouse body design usually determines the way how people use or operate the mouse. A mouse body generally consists of a housing, two click buttons (some types have more than two buttons), one scroll wheel, and a tracking sensor (mechanical roller with optical encoding disks, optical/laser sensor, etc.).

There are many different types of computer mice, which include mechanical mice, optical and laser mice, inertial and gyroscopic mice, pressure-sensitive mice (3D mice), tactile mice, ergonomic mice, and gaming mice. Almost all these mice currently available on marketplace are designed to work on a desk/mouse pad surface.

A typical traditional mouse configures a tracking sensor (e.g. mechanical roller, optical/laser sensor) on the bottom of the mouse body and two click buttons and a scroll wheel on the top of the body. Most of mice are designed for right hand use. When a right hand moves the mouse on a desk surface to control the pointer on a screen, the index finger operates left button and middle finger operates the right button. A scroll wheel is generally arranged between the two buttons. If the mouse is changed to left hand, the left hand has to use middle finger to operate left button and use index finger to operate right button. Now there are small quantity mice designed and manufactured specific for left hand. There are also small quantity of mice which have a mechanism to switch right and left configurations by either a switcher or by software. But most regular mice are for right hand use only. The flat surface dependent and right-hand mice are the most commonly used in office and at home. They are also most common and popular on marketplace.

A trackball mouse modified the mouse body design to arrange a trackball above the mouse bottom. An operator uses thumb or fingers to rotate the trackball in order to move the cursor on the display. A mechanical sensor (with optical encoding disks) or optical/laser sensor can be used to track the trackball's movement. For an optical/laser sensor, light beam is adjusted to trackball's surface in stead of a desk surface. Logitech Wireless Trackball M570 is an example of trackball mice, which applies wireless and laser sensor in the mouse. Trackball mice require less hand movement and less desk surface space.

Joystick mice and column/vertical mice designed the mouse body for optimal ergonomic fit to a hand. They allow a hand and wrist in a neutral angle position. An operator primarily moves arm in stead of wrist when mousing. To some extent this configuration can reduce fatigue on the arm and hand. 3M Ergonomic Optical Mouse (EM500GPS) is an example of joystick mouse. And Zero Tension Mouse (optical tracking) is an example of vertical mouse.

Most of the mice mentioned above are designed to be operated on a flat desk surface. When a hand uses a regular mouse, the hand has to turn its palm to desk surface. Then the ulna and radius bones on the arm are crossed. Many people have to keep this posture in work and leisure activities for a long time in front of computers. Since mousing activities at this posture use the same small muscles from fingers to shoulder over and over again, it can lead to discomfort, pain, and even can develop repetitive strain injury on the hand, arm, and shoulder. When using joystick mice and column/vertical mice, the ulna and radius bones on the arm are not crossed. But the hand, arm, and shoulder have to keep the same posture since they are tied on a desk surface. Thus they restrict user's hand and arm orientation. People have been looking for different ways to avoid this kind of discomfort and repetitive strain injury. They have promoted and designed many ergonomic computer mice.

U.S. Pat. No. 5,982,356 presented handheld mouse, which applied a joystick to drive a curser on a display screen. The joystick is arranged on the top of the handheld mouse body and is controlled by thumb. It is a symmetric design and is good for either right hand and left hand. The drawback is that the thumb has to raise up to control the joystick button. Thus it is not at thumb's natural and comfortable position.

U.S. D464053 S has the similar design as U.S. Pat. No. 5,982,356 in the shape. The difference is that U.S. D464053 S uses trackball on the top of the handheld mouse body.

U.S. Pat. Des. 380208 and Des. 385539 are similar designs by Jason R. Taylor. The designs did not indicate the click buttons and cursor driving element arrangement on the computer hand controller. The finger guard ring seems to be designed for fitting all fingers except thumb. If click buttons and scroll wheel are arranged in the finger guard ring, the gripping and clicking actions are not in an optimal situation.

U.S. Pat. Des. 430161 is also a handheld mouse design with a trackball on the top of the body and two finger guard rings for ring finger and little finger respectively. The trackball on the top makes the thumb in an uncomfortable situation. The two separate finger guard rings limit the two finger's freedom a little bit too much and will make the two fingers not feel comfortable.

U.S. Pat. D466510 and D478330 are designed by Tai-Her Yang. The trackball is on the top of the mouse body.

U.S. Pat. No. 6,816,151 B2, U.S. Pat. No. 7,379,052 B1, and U.S. RE40698 E are designed by Terry L. Dellinger. Trackball is arranged on the top of the mouse body under thumb's control.

U.S. Pat. No. 6,809,722 B2 is a handheld mobile mouse. Similar as previous referred patents, the trackball is arranged on the top of the mouse body under thumb's control.

US 2002/0171625 A1 presented a pistol-grip trackball mouse. This design arranged the trackball on the handle to allow thumb to easily control the trackball. However ring finger, little finger, and the hand part between thumb and index finger have not been fully taken use of to support the mouse. And it does not have the function that is able to be operated on a desk surface.

This invention takes the advantage of handheld mouse, but presents a unique design for the mouse body. It can be held by either right hand or left hand without needing to change user's operation habit since the click buttons are designed for index finger and middle finger instead of left click button and right click button. It can also be used on a flat desk surface with either right hand or left hand. Although it is a handheld mouse, its design is different from any patent mentioned above. Neither is it the same as any on marketplace.

IV. SUMMARY OF INVENTION

1. Technical Problem

Conventional computer mice are desk surface dependant. These mice may be commonly seen in office, at home, and on marketplace. When a person uses this kind of mouse, his/her ulna and radius bones on the arm are crossed. People have to twist wrist to operate the mouse on a desk surface and keep this posture in work and leisure activities for a long time in front of computers. The mousing activities require to use the same small muscles on the fingers, arm, and shoulder over and over again. This posture and mousing activities can lead to discomfort, pain, and even can develop repetitive strain injury on the hand, arm, and shoulder.

To reduce the fatigue and strain injury from fingers to shoulder caused by using the conventional mice, people developed joystick/vertical mice, which solved ulna-radius bones crossed problem. A user does not have to twist wrist when operating the joystick/vertical mouse. But the user has to keep the same posture during work since the mouse has to be operated on the desk surface. That means the activity requires to use a small amount of muscles along the arm over and over again. It will still cause fatigue stress on the arm and shoulder.

A handheld mouse does not depend on a desk surface. It has the advantage that allows hand, arm, and shoulder to choose a comfortable posture. Handheld mice can achieve zero-tension target to a great extent. However all handheld mouse designs and patents mentioned above in Background Art arrange the trackball (or joystick) on the top (or near the top) of the handheld mouse body. The thumb has to raise up to control the trackball (or joystick) on the top (or near the top) of the mouse body. It is a hard work for the thumb since the thumb is not at its natural position when working.

US 2002/0171625 A1 presented a pistol-grip trackball mouse with the trackball on the grip. It does not have the raising-thumb problem, but the mouse body is not easy to control and operate in a hand. It seems it is easy to drop when operating it. And it does not have the function that is able to be operated on a desk surface.

2. Technical Problem Solution

This invention tries to reduce and eliminate the tension and stress on fingers, hand, arm, and shoulder that caused by using unergonomic computer mice.

This invention takes handheld design to avoid desk surface restriction so that hand and arm are allowed to take a desired comfortable posture.

It is vertically symmetrical and suitable for either right hand use or left hand use. The click buttons are arranged in above and below order in stead of left and right order, which is suitable for vertical handhold. The left hand's index finger does not have to operate the right click button, which is the job for right hand's middle finger on a regular mouse. With this property, a user can change the mouse to the other hand when one hand feels tired.

Trackball is arranged near the middle of the handheld mouse body and close to the handle of the body so that the thumb can reach it at its natural posture without making effort. There is another way to operate the trackball. A user can hold the mouse body by one hand and use the other hand to rotate the trackball.

Finger guard ring and back extrusion on the handle allow the mouse to rest on a hand stably so that index finger and middle finger can work freely. When the ring finger and little finger push the finger guard ring out or pull the handle back, the mouse can rotate a bit about the hand part between thumb and index finger in the palm, which makes mousing activity more efficient, flexible, and interesting.

This invention can be used on a desk surface (even on a transparent desk surface). If some people get used to use a mouse on a desk surface, this invention allows these users to keep this habit. Considering some people sometimes want to use the invention on a desk surface as using a regular mouse, two spherical extrusions on each side of the mouse body are added. These two spherical extrusions plus trackball form a 3-points support for the mouse on a flat surface. When a hand moves this mouse on a desk surface, the trackball will roll on the flat surface and will move the cursor on the screen. It can work on any desk surface (even on a transparent desk surface) since the sensor detects trackball's surface instead of a desk surface. If you feel tired of holding or you are used to operate a mouse on a flat desk surface, you may do it. The way to operate it on a desk surface is just like the way to operate a conventional mouse.

3. Advantageous Effects of Invention

Firstly this invention is not dependent on a desk surface. Thus it avoids the restriction by a desk surface. Hand and arm can choose a desired comfortable posture when mousing. The handheld design reduces tension on the wrist, arm, and shoulder.

Secondly the design is symmetrical for either right hand or left hand. It makes it possible for a user to change hand to operate it if one hand feels tired. This can balance the mousing work load among the two hands to reduce fatigue stress.

Thirdly trackball is arranged near the middle of the mouse body where the thumb can reach it and rotate it at its natural posture. This design can reduce the fatigue on the thumb.

Fourthly finger guard ring and rear extrusion provide allow the mouse rest on a hand stably. Index finger and middle finger can work freely and easily. This design makes the mousing operation more comfortable, efficient, flexible, and more interesting.

Fifthly this invention can be operated on any desk surface (even on a transparent desk surface) as using a conventional mouse. This function makes mousing very flexible. You do not have to keep one posture. This function allows a user to keep his/her inhabit as using a conventional mouse.

V. BRIEF DESCRIPTION OF DRAWINGS

FIG. 1 to FIG. 10 include the shape, structure, features of each part and assembly. They also present the way of assembly, the ways to use it, and all other necessary details of the mouse body.

FIG. 1 presents the general design idea of the mouse body and the way how people hold it with hand. It may be held and operated by either right hand or left hand since it is vertically symmetrical. The hand part between thumb and index finger, ring finger, and little finger provide support for the mouse. While thumb rotates the trackball to control the cursor position, index finger and middle finger operate two click buttons and scroll wheel.

FIG. 2 demonstrates the complete assembly of the mouse body and identifies each part of the mouse body. Part 1 is Mouse Housing Left Half. Part 2 is Mouse Housing Right Half. Part 3 is Trackball. Part 4 is Trackball Cover. Part 5 is Index Finger Click Button. Part 6 is Middle Finger Click Button. Part 7 is Scroll Wheel.

FIG. 3 is the exploded view of the mouse body. It shows the assembling relationship of all the parts.

FIG. 4 and FIG. 4A demonstrate the features on Mouse Housing Left Half 1 and Mouse Housing Right Half 2. Since Mouse Housing Left Half 1 and Mouse Housing Right Half 2 are symmetrical identical about their assembling plane, FIG. 4 and FIG. 4A only indicate the features Mouse Housing Left Half 1.

Feature 101 is Grip Handle for holding.

Feature 102 is Finger Guard Ring, helping ring finger and little finger to hold and rotate the mouse in a hand palm. When the ring finger and little finger push the Finger Guard Ring 102 out or pull the Grip Handle 101 back, the mouse will rotate a bit about the hand part between thumb and index finger. This function may be used to adjust the mouse's location and orientation in a hand palm.

Feature 103 is Trackball Housing, in which the Trackball 3 is confined and rotates. It is partial spherical in shape and is built in the mouse housing.

Feature 104 is Slide Slot for Trackball Cover, in which Trackball Cover 4 can slide in and out.

Feature 105 is Curved Support Area, where the hand part between thumb and index finger supports the mouse.

Feature 106 is Rear Extrusion, creating the Curved Support Area 105 for the hand part between thumb and index finger.

Feature 107 is Curved Top Edge, which is designed to make the mouse body look aesthetic.

Feature 108 is Front Extrusion, which is created to make the mouse body look aesthetic.

Feature 109 is Sunken Space for Index Finger Click Button, where Index Finger Click Button 5 is installed.

Feature 110 is Sunken Space for Scroll Wheel, where Scroll Wheel 7 is installed.

Feature 111 is Sunken Space for Middle Finger Click Button, where Middle Finger Click Button 6 is installed.

Feature 112 are Spherical Extrusions for Using on Flat Surface, which are created to provide a 3-points support together with Trackball 3 when the mouse is used on a flat surface. Refer to FIG. 10.

FIG. 5 is the isometric view of Trackball Cover 4. Trackball Cover 4 can slide in the Slide Slot of Trackball Cover 104 in the assembly of Mouse Housing Left Half 1 and Mouse Housing Right Half 2 to separate Trackball 3 and hand palm. This can avoid resistance caused by the hand palm touching the Trackball 3. The inside diameter of the Trackball Cover 4 is 2 mm bigger than the Trackball's diameter to provide a gap between the two spherical surface. FIG. 5A shows the design for the two ends of the Trackball Cover 4.

Feature 401 is Cut-out for Flexibility, designed to make the two ends elastic and flexible when it squeezes into the Slide Slot for the Trackball Cover 104.

Feature 402 are Spherical Extrusions for Hold-on. There are four spherical extrusions on each end of the Trackball Cover 4 evenly separated on two edges. When the Trackball Cover 4 squeezes into the Slide Slot for the Trackball Cover 104, Spherical Extrusions for Hold-on 402 help to hold the Trackball Cover 4 on the wall of mouse housing.

FIG. 6 is an isometric view of the mouse, which shows that the Trackball Cover 4 is at an arbitrary position. FIG. 6A is the front view and FIG. 6B is the back view.

Figure 9:
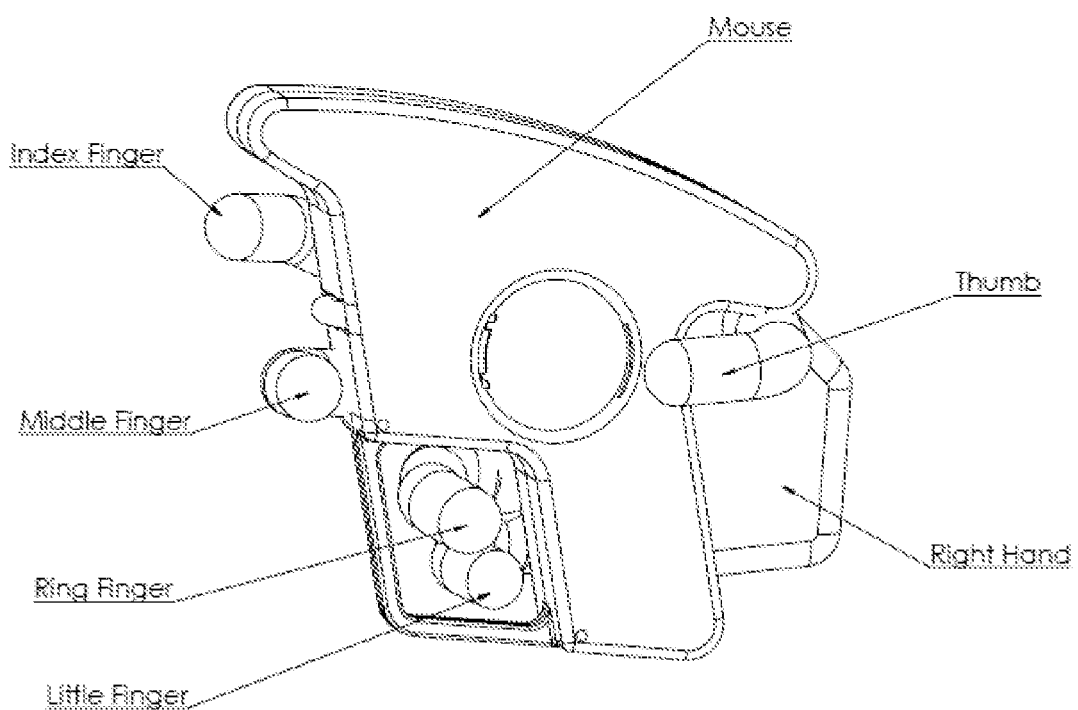

FIG. 9 gives an example that describes how to use this invention. It demonstrates how to hold it and the supposed positions and functions for each finger. This example is for right hand use. Since the invention is symmetrical identical for right and left, the way of holding, the supposed positions and functions of each finger are exactly the same for left hand use.

Figure 10A:
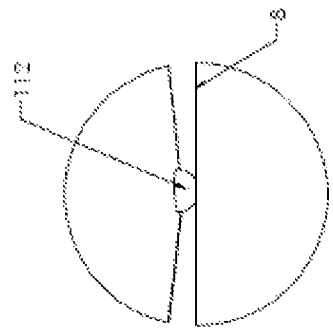
Figure 10B:
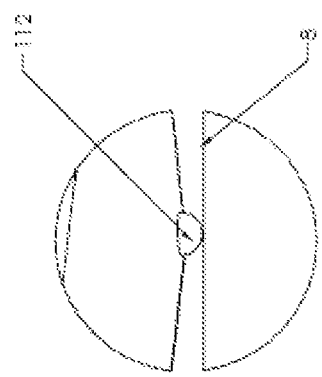
Figure 10:
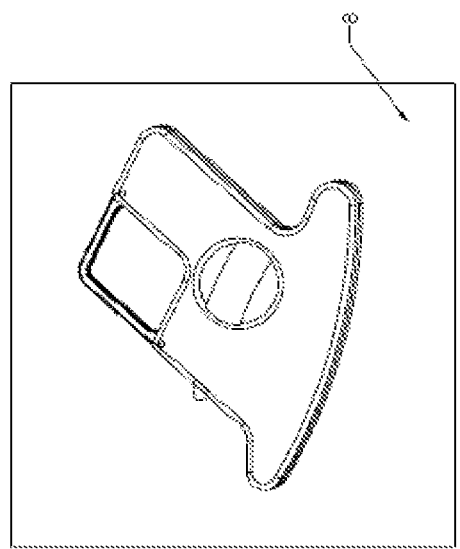
Figure 10C:
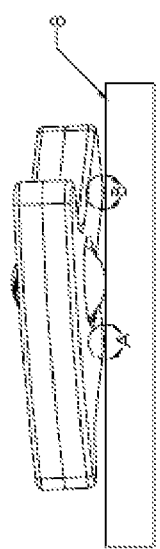

FIG. 10 describes how to use this invention on a flat surface. FIG. 10C is the front view of FIG. 10, showing that the Trackball 3 and two Spherical Extrusions for Using on Flat Surface 112 provide three supporting points for the mouse on the flat surface. FIG. 10A and FIG. 10B are detailed views from FIG. C to show feature 112s on the flat surface. When the mouse is moved by hand on the flat surface, the Trackball 3 will roll on the flat surface to move the cursor on the screen. This is the same way as using a conventional mouse on a flat desk surface.

VI. DESCRIPTION OF EMBODIMENTS

This invention aims to improve computer mouse body design to solve the discomfort and fatigue injury problem caused by using regular surface dependent computer mice. The inside design of computer mouse may use existed mousing technologies such as optical type, laser type, even mechanical type. For optical and laser types, the sensor should be arranged inside the mouse body so that light beam aims at the trackball surface instead of a desk or mouse pad surface. Wireless technology may apply to it to produce a cordless computer mouse. The examples that have successfully applied trackball and wireless technologies in a mouse are Logitech Wireless Trackball M570 and Kensington Orbit Wireless Mobile Trackball mice.

Figure 1:
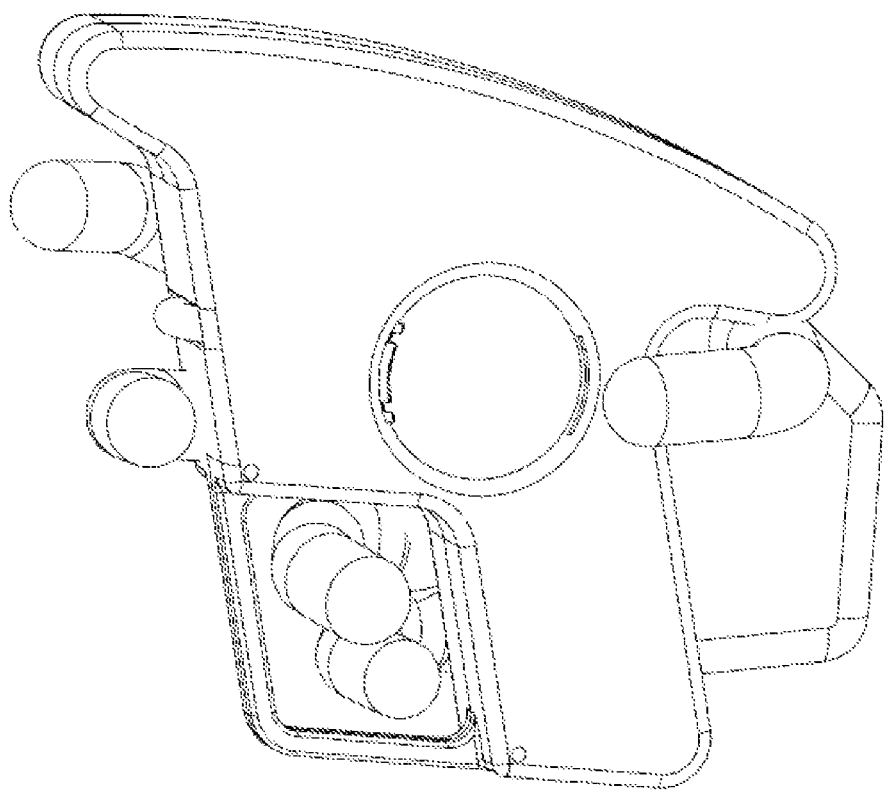
Figure 2:
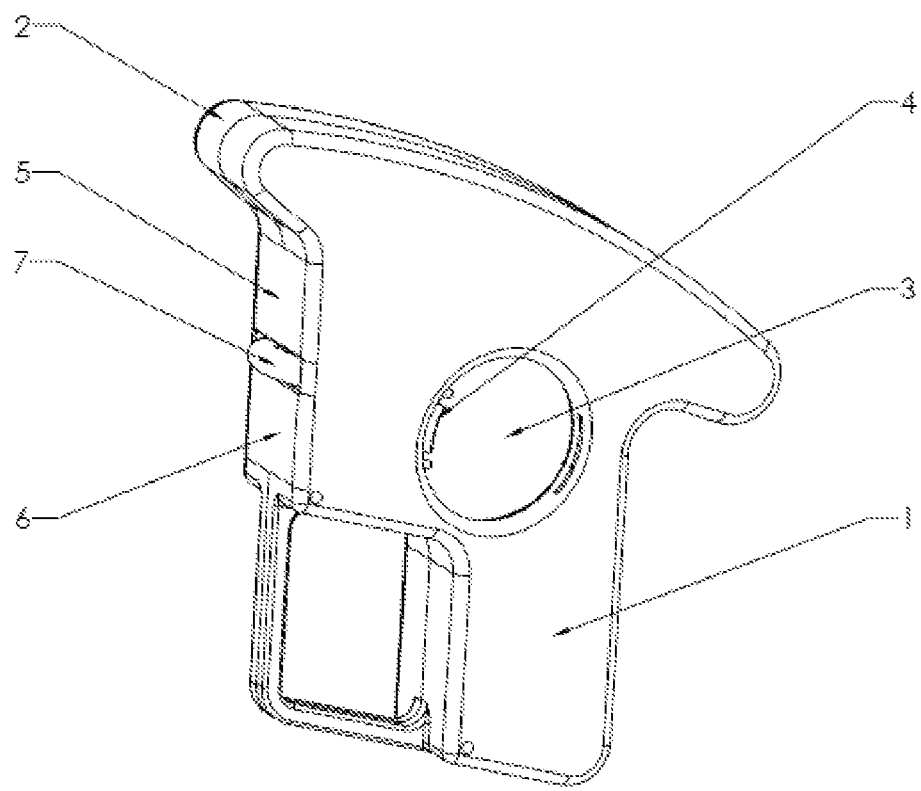

The computer mouse body consists of 7 parts, which are Mouse Housing Left Half 1, Mouse Housing Right Half 2, Trackball 3, Trackball Cover 4, Index Finger Click Button 5, Middle Finger Click Button 6, and Scroll Wheel 7 as shown in FIG. 2.

Figure 3:
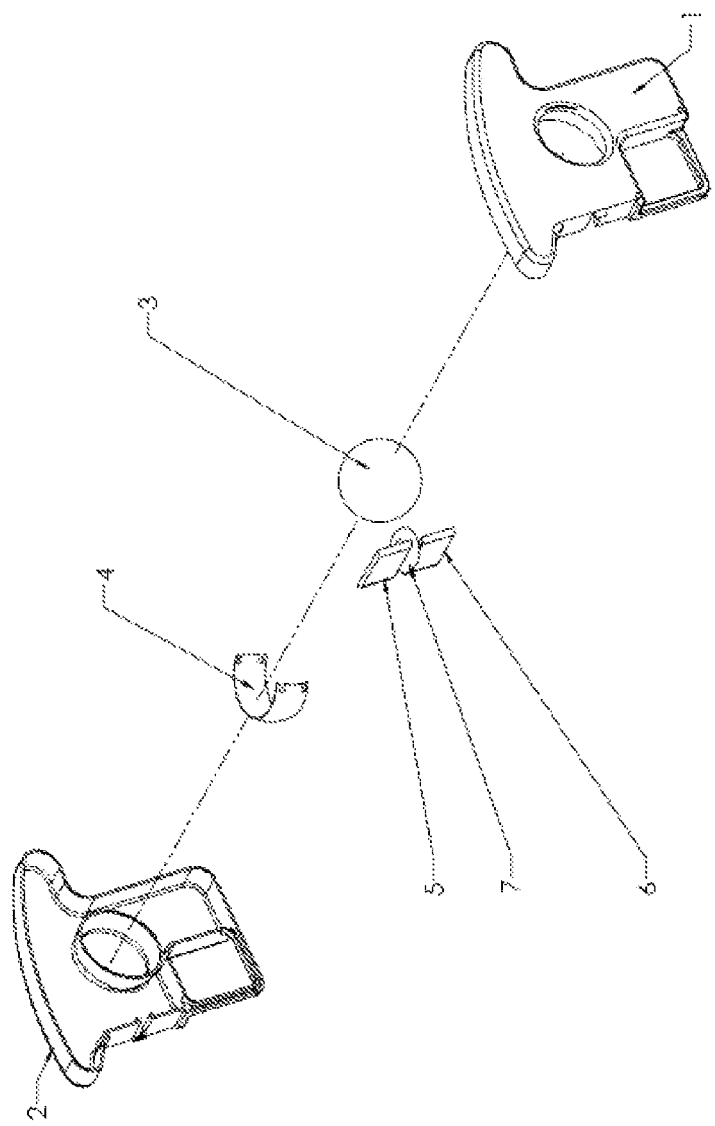

FIG. 3 shows the assembling relationship of all the parts.

Mouse Housing Left Half 1 and Mouse Housing Right Half 2 form the housing of the computer mouse, where inside mechanical components, electronic components, sensor, and printed circuit board are installed. Mouse Housing Left Half 1 and Mouse Housing Right Half 2 are symmetrical identical about their assembly plane. The features on each half are also symmetrical identical about the assembly plane.

Figure 4:
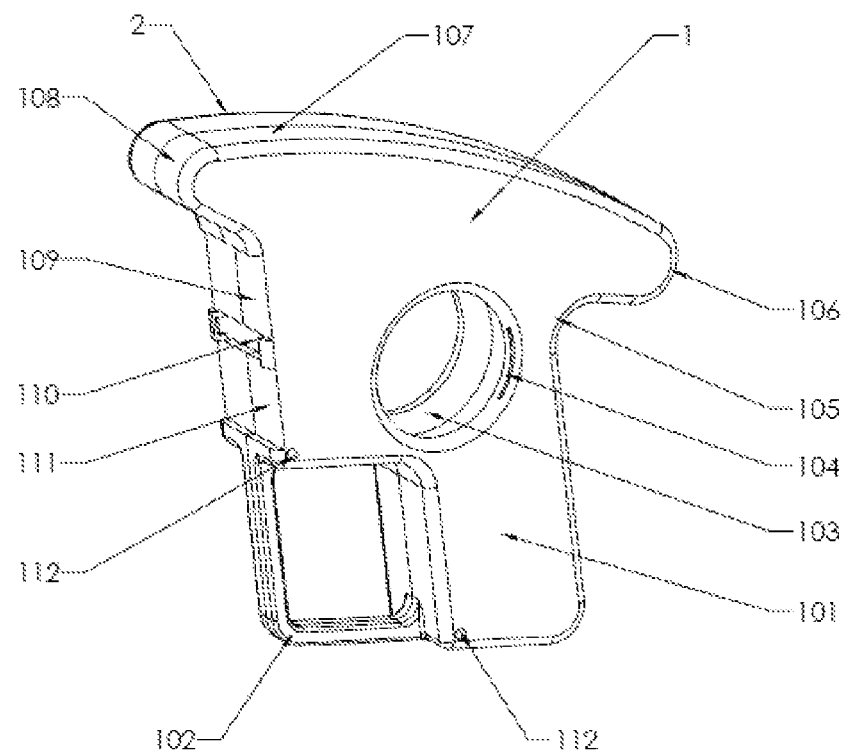
Figure 4A:
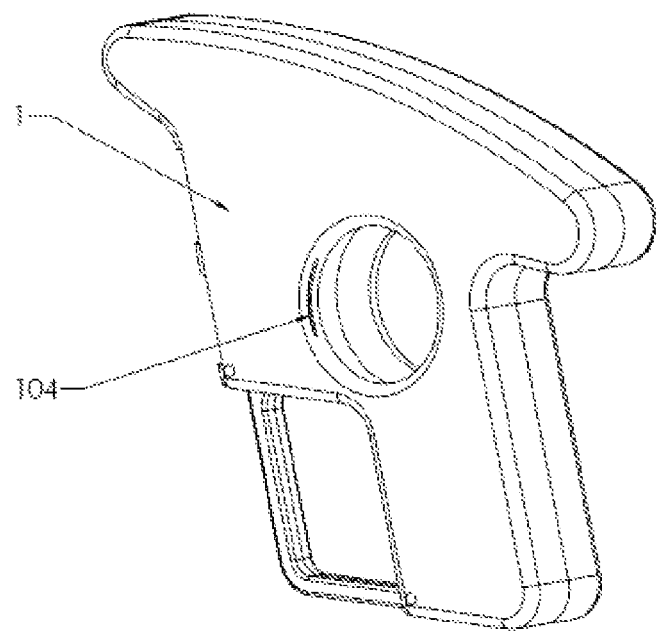

There 12 features on each half of the mouse housing as shown in FIG. 4 and FIG. 4A.

Feature 101 is Grip Handle, for holding.

Feature 102 is Finger Guard Ring, helping ring finger and little finger to hold and rotate the mouse in a hand palm. When the ring finger and little finger push the Finger Guard Ring out or pull the Grip Handle 101 back, the mouse will rotate a bit about the hand part between thumb and index finger. This function may be used to adjust the mouse's location and orientation in a hand palm.

Feature 103 is Trackball Housing, in which the Trackball 3 is confined and rotates. It is partial spherical in shape and is built in the mouse housing.

Feature 104 is Slide Slot for Trackball Cover 4, in which Trackball Cover (4) can slide in and out.

Feature 105 is Curved Support Area, where the hand part between thumb and index finger supports the mouse.

Feature 106 is Rear Extrusion, creating the Curved Support Area 105 for the hand part between thumb and index finger.

Feature 107 is Curved Top Edge, which is designed to make the mouse body look aesthetic.

Feature 108 is Front Extrusion, which is created to make the mouse body look aesthetic.

Feature 109 is Sunken Space for Index Finger Click Button, where Index Finger Click Button 5 is installed.

Feature 110 is Sunken Space for Scroll Wheel, where Scroll Wheel 7 is installed.

Feature 111 is Sunken Space for Middle Finger Click Button, where Middle Finger Click Button 6 is installed.

Feature 112 are Spherical Extrusions for Using on Flat Surface, which are created to provide a 3-points support together with Trackball 3 when the mouse is used on a flat surface. Refer to FIG. 10.

Figure 5A:
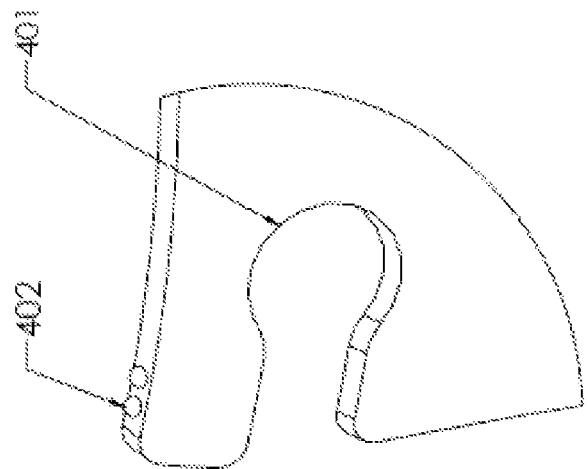
Figure 5:
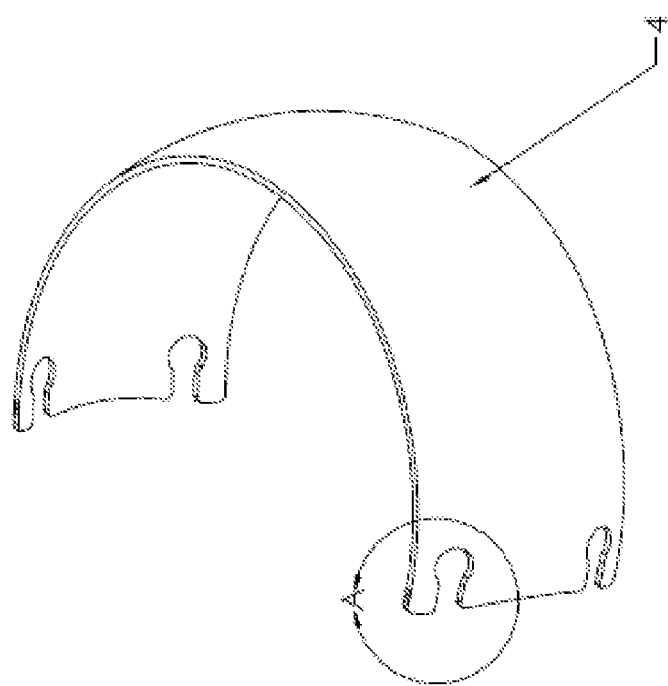

Trackball Cover 4 in FIG. 5 and FIG. 5A is designed to separate Trackball 3 and hand palm. The inside diameter of the Trackball Cover 4 is 2 mm bigger than the Trackball's diameter to provide a gap between the two spherical surface. It can avoid resistance caused by the hand palm touching the Trackball 3 and allows the Trackball 3 to rotate freely in the Trackball Housing 103.

Feature 401 in FIG. 5A is designed to make the two ends elastic and flexible when it squeezes into the Slide Slot of the Trackball Cover 104.

Feature 402 in FIG. 5A are Spherical Extrusions for Hold-on. There are four spherical extrusions on each end of the Trackball Cover 4 evenly separated on two edges. When the Trackball Cover squeezes into the Slide Slot of the Trackball Cover 104, feature 402s help to hold the Trackball Cover 4 on the wall of mouse housing.

As shown in FIG. 6, the Trackball Cover 4 can slide in the Slide Slot for Trackball Cover 104.

Figure 7A:
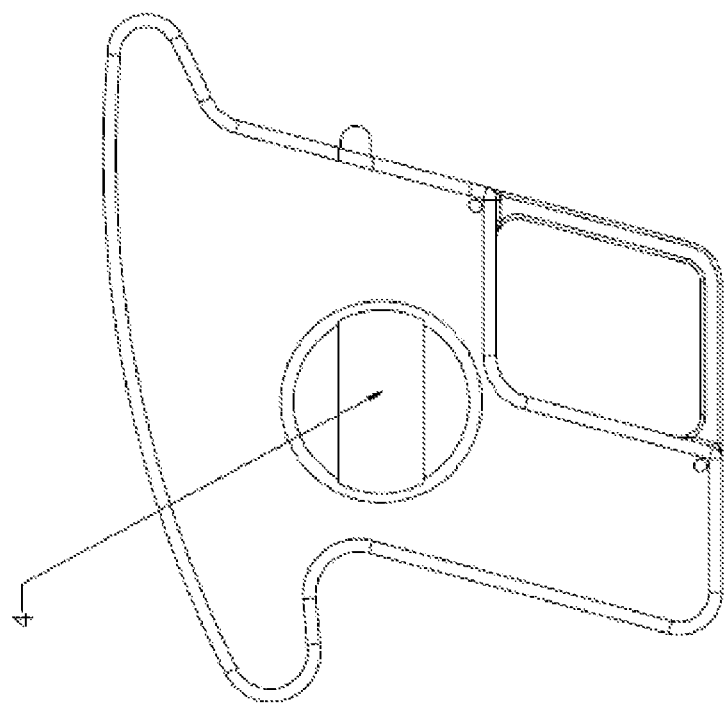
FIG. 7A is the back view.
Figure 7:
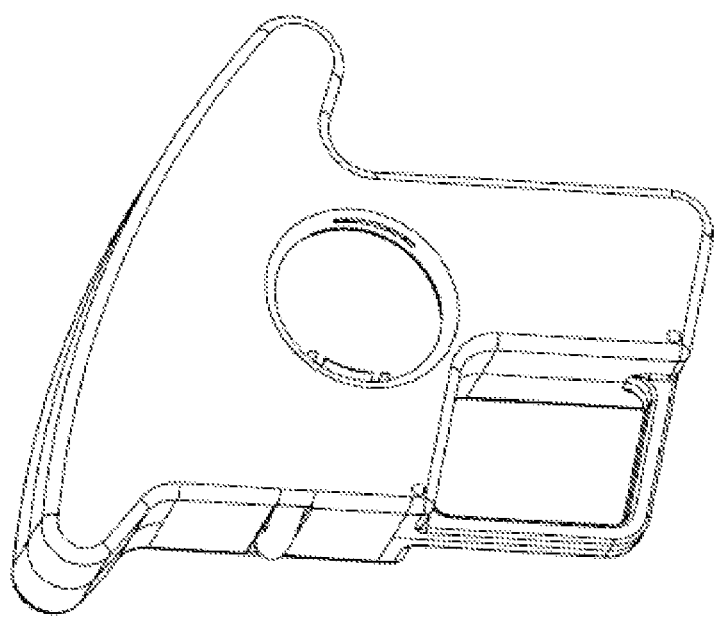
FIG. 7 is the isometric view of the mouse, which shows that Trackball Cover 4 is set at right side covering Trackball 3 on Mouse Housing Right Half 2 for right hand use configuration.

When a user wants to use right hand to hold the computer mouse, the Trackball Cover 4 may be pushed to right side and held by mouse housing wall as shown in FIG. 7 and FIG. 7A.

Figure 8A:
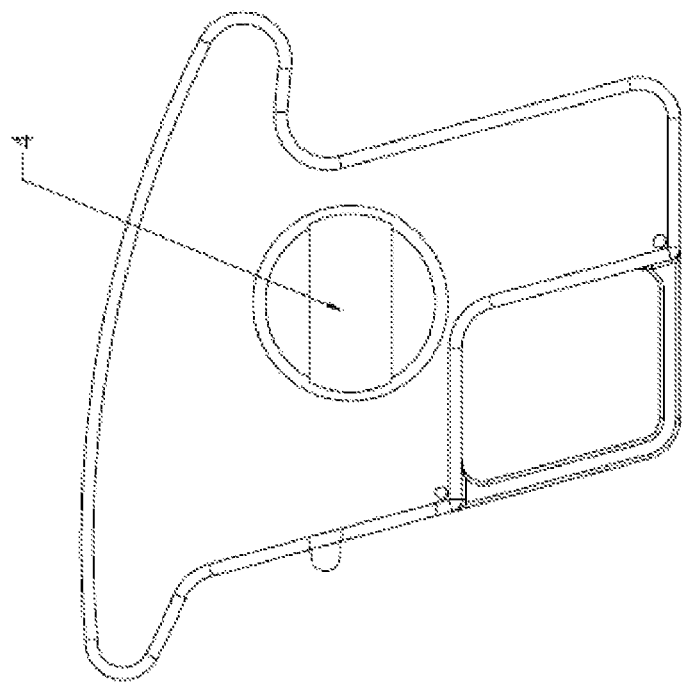
FIG. 8A is the back view.
Figure 8:
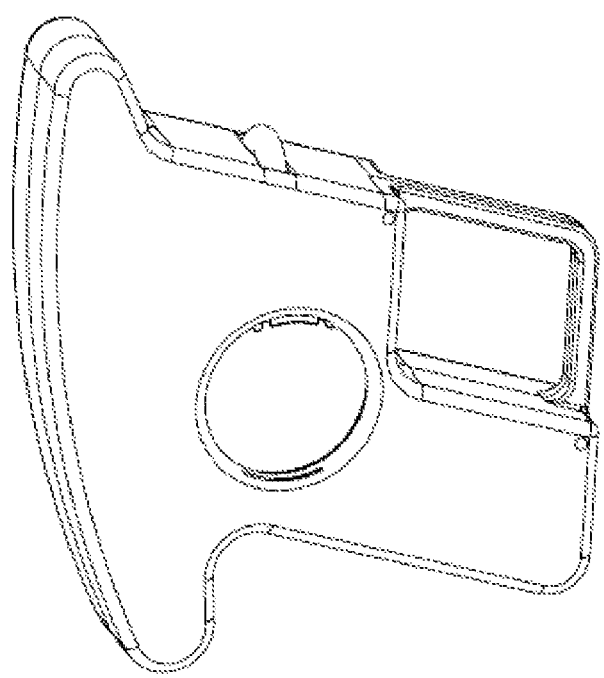
FIG. 8 is the isometric view of the mouse, which shows that Trackball Cover 4 is set at left side covering the Trackball 3 on Mouse Housing Left Half 1 for left hand use configuration.

When a user wants to use left hand to hold the computer mouse, the Trackball Cover 4 may be pushed to left side and held by mouse housing wall as shown in FIG. 8 and FIG. 8A.

When operating this invention, a hand may hold it as shown in FIG. 9. The hand part between thumb and index finger, ring finger, and little finger provide support for the mouse. Index finger operates Index Finger Click Button 5 which is above the Scroll Wheel 7. Middle finger operates Middle Finger Click Button 6 which is below the Scroll Wheel. Either index finger or middle finger may operate the Scroll Wheel 7. Thumb operates the Trackball 3.

If a user wants to use the computer mouse as a regular mouse on a desk surface, the mouse may be put on the desk surface as shown in FIG. 10, FIG. 10A, FIG. 10B, and FIG. 10C. The Trackball 3 and two Spherical Extrusions for Using on Flat Surface provide 3-points support for the mouse on the flat surface. When the mouse is moved by a hand on the flat surface, the Trackball 3 will roll on the flat surface to move the cursor on the screen. This is the same way as using a conventional mouse on a flat desk surface.

VII. INDUSTRIAL APPLICABILITY

Computer mice are largely used in office and at home. A computer mouse is an necessary accessory of computer. People use it to operate documents and navigate internet on a computer. In the office it is a production tool. People spend many hours a day on using computer and mice. That is why many people feel tired and uncomfortable with their hands and arms after finish one day's work. This is also the reason why many people have pain and have got fatigue injury on their hands and arms. This phenomenon has become very common in the modern society.

People have a big demand for computer mice using either in work environment or at home. There is a big market for computer mice. This invention can provide an option on the marketplace. This invention can eliminate or at least reduce discomfort and even fatigue injury caused by using regular flat surface dependent computer mice.

This invention presents a unique ergonomic computer mouse body design. The inside functions of the mouse may use the existed matured mousing technologies.

VIII. REFERENCE SIGNS LIST

The following is the list of reference signs for components and features on components:

1—Mouse Housing Left Half
101—Grip Handle
102—Finger Guard Ring
103—Trackball Housing
104—Slide Slot for Trackball Cover
105—Curved Support Area for the Hand Part between Thumb and Index Finger
106—Rear Extrusion
107—Curved Top Edge
108—Front Extrusion
109—Sunken Space for Index Finger Click Button
110—Sunken Space for Scroll Wheel
111—Sunken Space for Middle Finger Click Button
112—Spherical Extrusions for Using on Flat Surface
2—Mouse Housing Right Half
3—Trackball
4—Trackball Cover
401—Cut-out for Flexibility
402—Spherical Extrusion for Hold-on
5—Index Finger Click Button
6—Middle Finger Click Button
7—Scroll Wheel
8—Flat Surface

IX. REFERENCE TO DEPOSITED BIOLOGICAL MATERIAL

Not Applicable.

X. SEQUENCE LISTING FREE TEXT

Not Applicable.

XI. CITATION LIST

Patent Literature

US Patent Documents:

| | | | |
|---|---|---|---|
| 5,982,356 | November 1999 | Akiyama | 345/161 |
| D464,053 S | October 2002 | Zicolello | D14/409 |
| Des. 385,539 | October 1997 | Taylor | D14/114 |
| Des. 430,161 | August 2000 | Hovsepian | D14/402-410 |
| Des. 380,208 | June 1997 | Taylor | D14/114 |
| D463,435 S | September 2002 | Gatto, et al | D14/402 |
| D466,510 S | December 2002 | Yang | D14/417 |
| D478,330 S | August 2003 | Yang | D14/417 |
| RE40,698 E | April 2009 | Dellinger | 345/167 |
| 6,809,722 B2 | October 2004 | Yu Mei, et al | 345/163 |
| 6,816,151 B2 | November 2004 | Dellinger | 345/167 |
| 7,379,052 B1 | May 2008 | Dellenger | 345/167 |
| 6,222,526 B1 | April 2001 | Holmes | 345/161 |
| 2001/0035856 A1 | November 2001 | Myers | 345/156 |
| 2002/0075233 A1 | June 2002 | White, et al | 345/156 |
| 2002/0171625 A1 | November 2002 | Rothchild | 345/156 |
| 2003/0142069 A1 | July 2003 | Gatto, et al | 345/156 |
| 2005/0099389 A1 | May 2005 | Ma, et al | 345/158 |
| 2014/0145953 A1 | May 2014 | Tsiopanos, et al | 345/161 |

Foreign Patent Documents:

| | | | |
|---|---|---|---|
| EP 1 197 915 A1 | April 2002 | Robinson, et al | Int Cl.: G06K 11/18 |
| CN2404162Y | November 2000 | Tape | G06K11/18 |
| CN2621315Y | June 2004 | Hai | G06F3/033 |
| CN2758861Y | February 2006 | Yellow | G06F3/033 |
| CN201302705Y | September 2009 | Warming | G06F3/033 |

Non Patent Literature www.logitech.com
www.kensington.com

What is claimed is:

1. An ergonomic computer mouse comprising:
   a computer mouse housing having a front end, a back end, a top end, and opposite first and second sides;
   said computer mouse housing defining a grip handle for holding, a finger guard ring located on said front end of said grip handle, a trackball housing having an opening formed through each of said first and second sides, a slide slot formed through each of said first and second sides and approximate said opening on each side, a plurality of sunken spaces formed on said front end of said grip handle, and two spherical-shaped extrusions disposed on each of said first and second sides and arranged to support said computer mouse housing on a desk surface with said first and second sides oriented generally planar with said desk surface;
   a trackball disposed within said trackball housing for rotation therein;
   a trackball cover disposed within said slide slots and slidable therein between a first position wherein said trackball cover extends across and outwardly of said trackball and the opening formed through said first side and a second position wherein said trackball cover extends across and outwardly of said trackball the opening formed through said second side;
   a index finger click button disposed in one sunken space of said plurality of sunken spaces;
   a middle finger click button disposed in second sunken space of said plurality of sunken spaces; and
   a scroll wheel disposed in a third sunken space of said plurality of sunken spaces, wherein said third sunken spaced is located between said first and said second sunken space.

2. The ergonomic computer mouse of claim 1, wherein said computer mouse housing further defines a rear extrusion that is disposed to rest upon a user's hand part located between the thumb and index finger when said grip handle is held by the user's hand.

3. The ergonomic computer mouse of claim 1, wherein said rear extrusion is smoothly curved and has a curved support area for the hand part located between the user's thumb and index finger.

4. The ergonomic computer mouse of claim 1, wherein said trackball cover is a partial spherical shell.

5. The ergonomic computer mouse of claim 1, wherein said index finger click button, said scroll wheel, and said middle finger click button are arranged in said order, in a direction away from said top end.

* * * * *